United States Patent
Smook (10) Patent No.: US 8,425,374 B2
(45) Date of Patent: Apr. 23, 2013

(54) PLANETARY GEAR UNIT

(75) Inventor: Warren Smook, Huldenberg (BE)

(73) Assignee: Hansen Transmissions International N.V., Kontich (BE)

( * ) Notice: Subject to any disclaimer, the term of this patent is extended or adjusted under 35 U.S.C. 154(b) by 373 days.

(21) Appl. No.: 12/955,051

(22) Filed: Nov. 29, 2010

(65) Prior Publication Data
US 2011/0130243 A1 Jun. 2, 2011

(30) Foreign Application Priority Data

Dec. 1, 2009 (EP) .................................... 09447062
Dec. 1, 2009 (EP) .................................... 09447062

(51) Int. Cl.
*F16H 57/08* (2006.01)

(52) U.S. Cl.
USPC .............................. 475/348; 475/331; 475/346

(58) Field of Classification Search .................. 475/331, 475/346, 348
See application file for complete search history.

(56) References Cited

U.S. PATENT DOCUMENTS 2,084,843 A * 6/1937 Harris ............................ 475/335
2,768,698 A * 10/1956 Fabian .......................... 180/255
3,087,078 A * 4/1963 Brown ............................ 310/83
2007/0238575 A1 10/2007 Wang et al.
2011/0245031 A1* 10/2011 Saenz De Ugarte Sevilla et al. ............................. 475/347

FOREIGN PATENT DOCUMENTS

| CN | 102466027 A | * | 5/2012 |
| DE | 10 2005 013939 A1 | | 9/2006 |
| EP | 1 184 596 A2 | | 3/2002 |

OTHER PUBLICATIONS

European Search Report, dated May 3, 2010, from corresponding European application.

* cited by examiner

*Primary Examiner* — Tisha Lewis
(74) *Attorney, Agent, or Firm* — Young & Thompson (57) ABSTRACT

A planetary gear unit includes a planet carrier having a backplate and being provided with planet shafts distributed uniformly around the planet carrier's axis and extending through bores in the backplate, each planet shaft rotatably supporting a pair of planet gears by planet bearings, the planet gears being mounted between a ring gear and a sun gear for mutual interaction. The planetary gear unit further includes a key provided in a keyway of the planet shaft and extending to the backplate for preventing the at least one planet shaft from rotating around its own axis. The key and keyway are provided at a location positioned between 45° and 270° in a clockwise direction around the circumference of the planet shaft, with 0° being defined as a point at the planet shaft circumference corresponding with the largest distance from the centre of the back plate seen from the rotor side onwards.

10 Claims, 4 Drawing Sheets

PLANETARY GEAR UNIT

TECHNICAL FIELD OF THE INVENTION

The present invention relates to a gear unit for wind turbines. More particularly, the present invention relates to a planetary gear unit, a gearbox comprising such a planetary gear unit and a wind turbine comprising such a gearbox.

BACKGROUND OF THE INVENTION

Figure 1A:
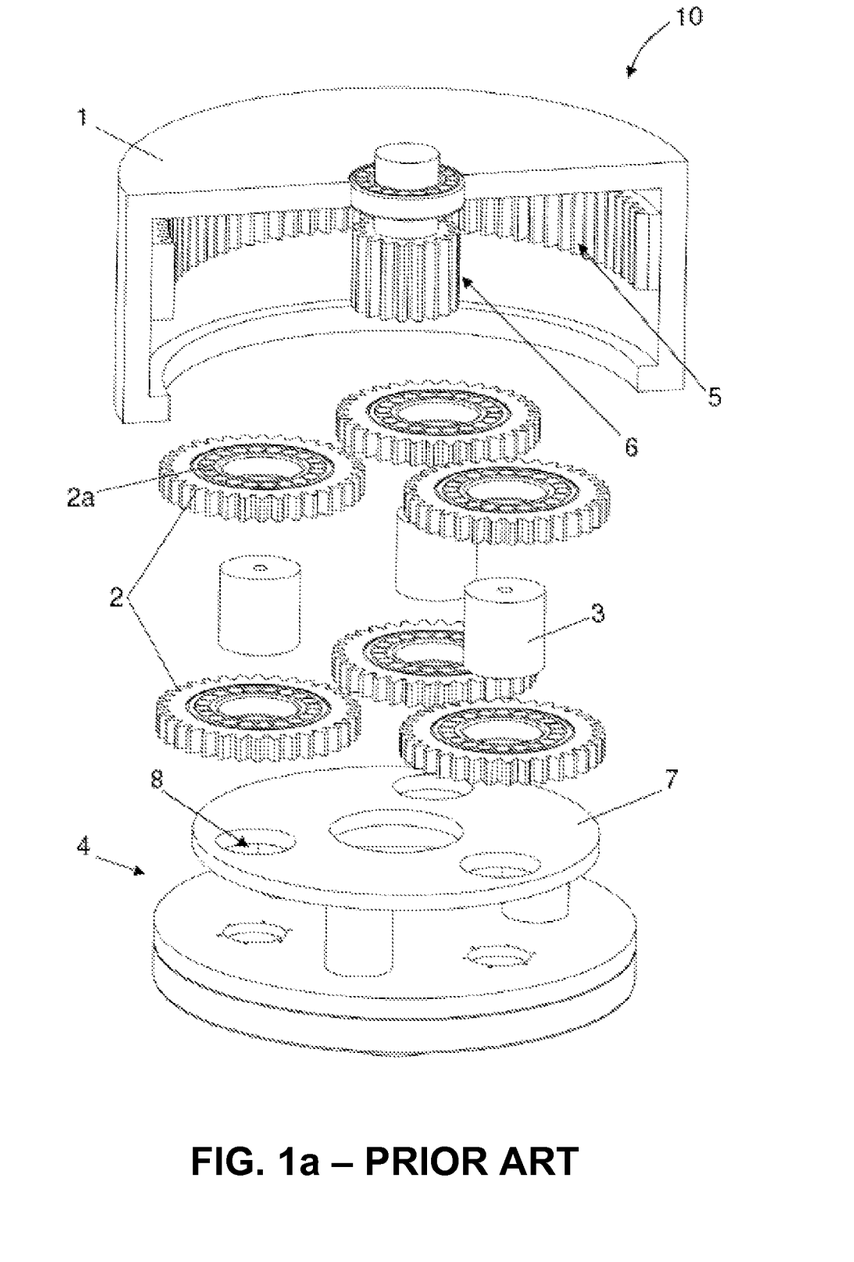
FIG. 1a and FIG. 1b schematically illustrate a planetary gear unit according to the prior art.
Figure 1B:
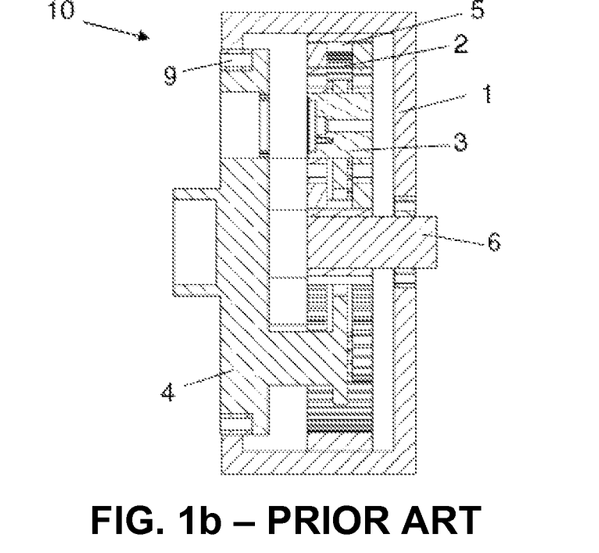

Gearboxes for wind turbines may comprise at least one planetary gear unit comprising a planet carrier, planet gears, a sun gear and a ring gear. FIG. 1a and FIG. 1b schematically illustrate a planetary gear unit 10 according to the prior art. The planetary gear unit 10 comprises a housing 1 in which a plurality of planet gears 2 and planet shafts 3 and a planet carrier 4 are located. The planet gears 2 are rotatably supported by planet bearings 2a. The planetary gear unit 10 furthermore comprises a ring gear 5 and a sun gear 6 for mutual interaction with the planet gears 2. The planet carrier 4 comprises a backplate 7 with bores 8 through which the planet shafts 3 extend. The planet carrier 4 is connected to the rotor hub (not shown) of the wind turbine and is rotatably mounted in the housing 1 by means of planet carrier bearing 9 (see FIG. 1b).

Gearbox designs are known in which the planet carrier bearing, next to rotatably supporting the planet carrier, also serves as a main bearing for supporting the rotor hub to which the planet carrier 4 is connected. However, using one main bearing to support both the rotor hub and the planet carrier 4 is less rigid than in the more classical designs whereby the rotor hub and the planet carrier 4 are supported by separate bearings. When using one main bearing for supporting both the rotor hub and the planet carrier 4, misalignments may occur between the planet carrier 4 and the ring gear 5 which increase the risk of causing damage to the planet gears 2.

A known solution to this problem is to fix the planet shafts 3 to the planet carrier 4 in a more or less flexible way, as is known in the prior art. However, in this case and under particular circumstances, e.g. under particular loads, the planet shafts 3 may rotate around their own axis and with respect to the planet carrier 4. Rotation of the planet shafts 3 during operation of the gearbox can cause damages. As a consequence, the life time of the planetary gear unit 10 may be decreased.

SUMMARY OF THE INVENTION

It is an object of embodiments of the present invention to provide a planetary gear unit, a gearbox comprising such a planetary gear unit and a wind turbine comprising such a gearbox.

In a first aspect, the present invention provides a planetary gear unit comprising:
- a planet carrier comprising a backplate and being provided with planet shafts distributed uniformly around the planet carrier's axis and extending through bores in the backplate, each planet shaft rotatably supporting a pair of planet gears by means of planet bearings, the planet gears being mounted between a ring gear and a sun gear for mutual interaction, and
- a key provided in a keyway in at least one of the planet shafts and extending to the backplate for preventing the at least one planet shaft from rotating around its own axis, wherein the key and keyway are provided at a location positioned between 45° and 270° in a clockwise direction around the circumference of the at least one planet shaft as seen from rotor side onwards. Hereby, 0° is defined as a point at the planet shaft circumference corresponding with the largest distance from the centre of the backplate seen from the rotor side onwards and closest to a side of the backplate.

According to a preferred embodiment, a key and keyway may be provided in each of the planet shafts in the planetary gear unit.

The key and keyway may be located such that, under conditions whereby the planet shaft is prevented from rotating relatively to the backplate through the working of friction, elastic deformation of the backplate causes the key and keyway to be displaced in the backplate such that there is substantially no contact between the key and the keyway in the planet shaft.

Moreover, preferably the key and keyway are not located at a location or a zone of high stresses of the bores in the backplate. The existence and location of zones of high stresses in the bores is dependent on the type of planetary gear unit and thus depending on the type of backplate used. However, for each type of backplate, a person skilled in the art can easily determine the existence and location of such zones of high stresses along the bores in the backplate.

By providing a key and keyway as described according to embodiments of the present invention, the planet shafts will be prevented from rotating around their own axis with respect to the planet carrier without limiting the degrees of freedom of these shafts and without disturbing normal functioning of the planetary gear unit, more particularly without disturbing normal functioning of the backplate.

According to particular embodiments of the invention, the key and keyway may be provided at a location positioned between 90° and 270° or between 90° and 225°.

According to further particular embodiments of the invention, the key and keyway may be provided at a location positioned between 90° and 200° or between 90° and 180° or between 100° and 225° or between 100° and 200° or between 100° and 180°.

According to specific embodiments, the backplate may be a bogie plate on which the planet shafts are mounted and which is connected to a remaining part of the planet carrier by means of studs, each planet shaft supporting a pair of planet gears, the planet gears of each pair being mounted at opposite sites of the bogie plate.

Suitable keys to be applied with embodiments of the present invention may be any key with any suitable shape as known by a person skilled in the art and may, fore example but not limited to, have a rectangular or circular shape.

In a second aspect, the present invention provides a gearbox comprising a planetary gear unit according to embodiments of the invention. The planetary gear unit comprises:
- a planet carrier comprising a backplate and being provided with planet shafts distributed uniformly around the planet carrier's axis and extending through bores in the backplate, each planet shaft rotatably supporting a pair of planet gears by means of planet bearings, the planet gears being mounted between a ring gear and a sun gear for mutual interaction, and
- a key provided in a keyway in at least one of the planet shafts and extending to the backplate for preventing the at least one planet shaft from rotating around its own axis, wherein the key and keyway are provided at a location positioned between 45° and 270° in a clockwise direction around the circumference of the at least one planet shaft as seen from the rotor side onwards. Hereby, 0° is defined as a point at the planet shaft circumference corresponding with the largest distance from the centre of the backplate seen from the rotor side onwards and closest to a side of the backplate.

According to embodiments of the invention, providing the key and keyway may be performed such that, under conditions whereby the planet shaft is prevented from rotating relatively to the backplate through the working of friction, elastic deformation of the backplate causes the key and keyway to be displaced in the backplate such that there is substantially no contact between the key and the keyway in the planet shaft and such that the key and keyway are not located at a location or a zone of high stresses along the bores in the backplate.

According to particular embodiments of the invention and, amongst others, depending on the design and shape of the backplate, the key and keyway may be provided at a location positioned between 90° and 270° or between 90° and 225°. According to further particular embodiments of the invention, the key and keyway may be provided at a location positioned between 90° and 200° or between 90° and 180° or between 100° and 225° or between 100° and 200° or between 100° and 180°.

In a third aspect, the present invention provides a wind turbine comprising a gearbox comprising a planetary gear unit according to embodiments of the invention. The planetary gear unit comprises:

a planet carrier comprising a backplate and being provided with planet shafts distributed uniformly around the planet carrier's axis and extending through bores in the backplate, each planet shaft rotatably supporting a pair of planet gears by means of planet bearings, the planet gears being mounted between a ring gear and a sun gear for mutual interaction, and a key provided in a keyway in at least one of the planet shafts and extending to the backplate for preventing the at least one planet shaft from rotating around its own axis, wherein the key and keyway are provided at a location positioned between 45° and 270° in a clockwise direction around the circumference of the at least one planet shaft as seen from the rotor side onwards. Hereby, 0° is defined as a point at the planet shaft circumference corresponding with the largest distance from the centre of the backplate seen from the rotor side onwards and closest to a side of the backplate.

According to particular embodiments of the invention and, amongst others, depending on the design and shape of the backplate, the key and keyway may be provided at a location positioned between 90° and 270° or between 90° and 225°. According to further particular embodiments of the invention, the key and keyway may be provided at a location positioned between 90° and 200° or between 90° and 180° or between 100° and 225° or between 100° and 200° or between 100° and 180°.

DESCRIPTION OF ILLUSTRATIVE EMBODIMENTS

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way.

The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention will be described by means of different embodiments. It has to be understood that these embodiments are only for the ease of understanding the invention and are not intended to limit the invention in any way.

The present invention relates to a planetary gear unit with sun, planet and ring gears, planet shafts and a planet carrier, whereby on both sides of the planet shaft a planet gear is mounted on the planet shaft by means of planet bearings. The present invention furthermore relates to a gearbox comprising such a planetary gear unit and to a wind turbine comprising such a gearbox.

In a first aspect, the present invention provides a planetary gear unit. The planetary gear unit comprises a planet carrier comprising a backplate. The planet carrier is provided with planet shafts distributed uniformly around the planet carrier's axis and extending through bores in the backplate. Each planet shaft rotatably supports a pair of planet gears by means of planet bearings, the planet gears being mounted between a sun gear and a ring gear for mutual interaction. The planetary gear unit furthermore comprises a key provided in a keyway in at least one of the planet shafts and extending to the backplate for preventing the at least one planet shaft from rotating around its own axis. According to the present invention, the key and keyway are provided in the at least one planet shaft at a location positioned between 45° and 270° in a clockwise direction around the circumference of the planet shaft as seen from the rotor side onwards, with 0° being defined as a point at the planet shaft circumference corresponding with the largest distance from the centre BC of the bogie plate seen from the rotor side onwards.

According to embodiments of the invention, a key and keyway may be provided in all planet shafts of the planetary gear unit.

The location of the key and keyway may be such that, under conditions whereby the planet shaft is prevented from rotating relatively to the backplate through the working of friction, elastic deformation of the backplate causes the key and keyway to be displaced in the backplate such that there is substantially no contact between the key and the keyway in the planet shaft. Depending on the design or shape of the backplate, it was found that such locations are between 45° and 270° in a clockwise direction around the circumference of the planet shaft.

With "under conditions whereby the planet shaft is prevented from rotating relatively to the backplate through the working of friction" is meant during normal working conditions under which high loads, more particularly high torque, is introduced in the planetary gear unit. Under such normal working conditions of the planetary gear unit, i.e. at high torque, the location of the key and keyway should be such that, with respect to the planet shaft and backplate, it is as if the key was not there and the planet shaft and the backplate do not "feel" the presence of this key. Under such conditions, friction between the planet shaft and a side of the bore in which the shaft is located is high enough to prevent the planet shaft from rotating around its own axis. Under low load conditions, however, such friction is not high enough for preventing the planet shaft from rotating around its own axis and in that case the location of the key and keyway should be such that the key blocks the planet shaft.

Moreover, suitable locations for the key and keyway do preferably not coincide with locations along the bores in the backplate that show high stress (see further). The existence and location of zones of high stresses may be dependent on the type of planetary gear unit and, more particularly may be depending on the design, shape and type of backplate used. However, for each design and type of backplate, a person skilled in the art can easily determine the existence and location of such zones of high stresses along the bores in the backplate.

According to particular embodiments of the invention and depending on the design, shape and type of the backplate 13, the key and keyway may be provided at a location positioned between 90° and 270° or between 90° and 225°. According to further particular embodiments of the invention, the key and keyway may be provided at a location positioned between 90° and 200° or between 90° and 180° or between 100° and 225° or between 100° and 200° or between 100° and 180° in a clockwise direction around the circumference of the planet shaft.

Hence, the present invention provides a way for determining an optimum location for providing a key and keyway in a planet shaft of a planetary gear unit. The invention teaches that finding such optimum location is a question of finding a compromise between a location where, on the one hand, under normal working conditions whereby the planet shaft is prevented from rotating around its own axis and relatively to the backplate through the working of friction, elastic deformation of the backplate causes the key and keyway to be displaced in the backplate such that there is substantially no contact between the key and the keyway in the planet shaft, and, on the other hand, a location not coinciding with zones of high stresses along the bores in the backplate, or in other words zones of substantially lower stress along the bores in the backplate compared to other zones of stress along these bore in the backplate.

By providing a key and keyway as described according to embodiments of the present invention, the planet shafts will be prevented from rotating around their own axis with respect to the planet carrier without limiting the degrees of freedom of these shafts and without disturbing normal functioning of the planetary gear unit, more particularly without disturbing normal functioning of the backplate, e.g. bogie plate.

An advantage of a planetary gear unit according to embodiments of the invention is that, because rotation of the planet shafts around their own axis is prevented, the chance of damages occurring during operation of the planetary gear unit is reduced. As a consequence, lifetime of the planetary gear unit may be increased.

Hence, embodiments of the invention result in a free of wear contact between planet shafts and planet carrier, thereby allowing all degrees of freedom of the planet shaft without disturbing the load distribution between the planet gears of a pair on one planet shaft.

According to particular embodiments of the invention, the backplate may be a bogie plate on which the planet shafts are mounted and which is connected to a remaining part of the planet carrier by means of studs. According to such embodiments, each planet shaft supports a pair of planet gears, the planet gears of each pair being mounted at opposite sites of the bogie plate.

Hereinafter, the invention will further be described by means of the backplate being a bogie plate. It has to be understood that this is only for the ease of explanation and is not intended to limit the invention in any way. The invention may be applied to any kind of backplate having bores in which planet shafts of a planetary gear unit are provided.

Figure 2:
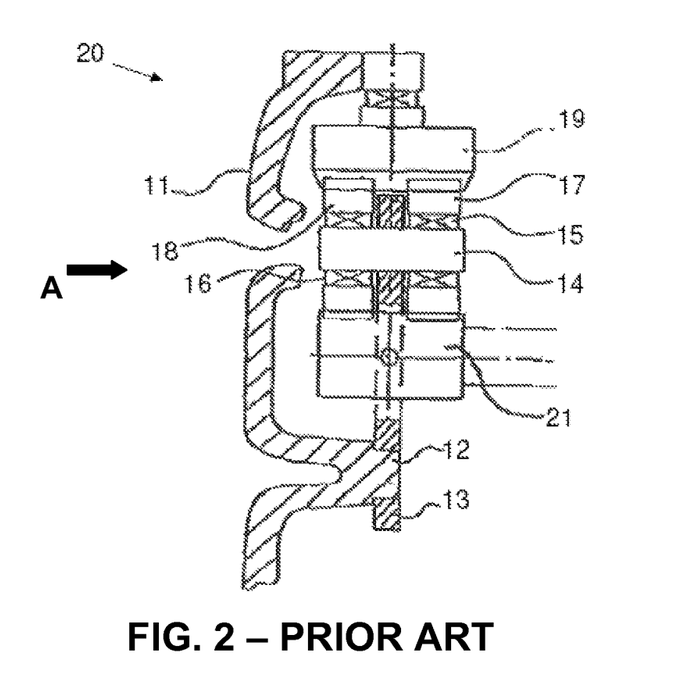
FIG. 2 illustrates a planetary gear unit with a planet carrier comprising a bogie plate according to the prior art.

FIG. 2 illustrates a planetary gear unit 20 as known by a person skilled in the art. The planetary gear unit 20 comprises a planet carrier 11 comprising three integral and uniformly circumferentially spaced studs 12 which support a bogie plate 13. The bogie plate 13 provides support for three circumferentially uniformly spaced planet shafts 14 arranged each, as viewed in the plane of FIG. 2, to self adjust in angular position on the bogie plate 13. Each planet shaft 14 provides support, at opposite sides of the bogie plate 13, for a pair of planet bearings 15, 16 about which each of a pair of planet gears 17, 18 are rotatably mounted for engagement with a ring gear 19 and a sun gear 21.

As already described earlier, under particular circumstances, the planet shafts 14 may rotate around their own axis and with respect to the bogie plate 13. A solution to that problem is to provide a key in a keyway in the planet shafts 14 and extending to the bogie plate 13 for preventing the planet shafts 14 from rotating around their own axis and with respect to the bogie plate 13.

A crucial issue, however, is where to provide such a key and keyway in the planet shaft 14. Two important criteria are to be considered, i.e. kinematics on the one hand and stresses in the bores in the bogie plate 13 on the other hand. First, when providing the key and keyway one has to be sure that, under normal working conditions or, in other words, in circumstances whereby the planet shaft 14 is prevented from rotating relatively to the bogie plate 13 through the working of friction between the planet shaft 14 and a side of the bore, elastic deformation of the bogie plate 13 causes the key and keyway to be displaced in the bogie plate 13 such that there is substantially no contact between the key and the keyway in the planet shaft 14. In other words, under such conditions it should be as if the key was not there, as was already discussed above. Second, during operation of the planetary gear unit 20, the bores in the bogie plate 13 will be deformed. Such deformation causes stresses at particular locations in the bores. Best locations for locating the key and keyway are, in the context of this deformation, locations where this deformation has substantially no influence on the key or in other words does not introduce high stresses in the bores in the bogie plate 13.

Embodiments of the present invention teach that determining optimum locations for providing the key at the planet shaft 14 requires a compromise between the above described criteria. It was found that such optimum locations may be locations positioned between 45° and 270° in a clockwise direction around the circumference of the planet shaft 14 as seen from the rotor side onwards, with 0° being defined as a point at the planet shaft circumference corresponding with the largest distance from the centre BC of the bogie plate 13 seen from the rotor side onwards.

According to particular embodiments of the invention, the key and keyway may be provided at a location positioned between 90° and 270° or between 90° and 225°.

According to further particular embodiments of the invention, the key and keyway may be provided at a location positioned between 90° and 200° or between 90° and 180° or between 100° and 225° or between 100° and 200° or between 100° and 180° in a clockwise direction around the circumference of the planet shaft.

Figure 3:
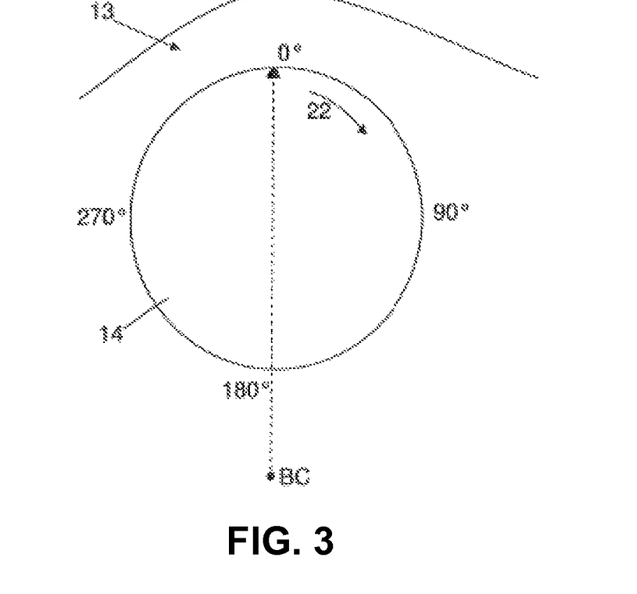
FIG. 3 to FIG. 6 schematically illustrate the principle of a planetary gear unit comprising a key and keyway according to embodiments of the invention.

These locations are more clarified and visualised in FIG. 3. This figure schematically illustrates a planet shaft 14 provided in a bore of a bogie plate 13. It is known by a person skilled in the art that a bogie plate 13 does not have a circular shape, but has a shape with varying diameter, and thus varying radius. In the figure, BC indicates the centre of the bogie plate 13. The point of 0° is defined as the point at the planet shaft circumference corresponding with the largest distance from the centre BC of the bogie plate 13 (indicated by the dashed line in FIG. 3). The other locations are then defined in a clockwise direction, which is indicated by arrow 22, around the circumference of the planet shaft 14.

Hereinafter, the idea behind the determination of the optimum locations for the key and keyway at the planet shaft 14 will be described in detail.

Figure 4:
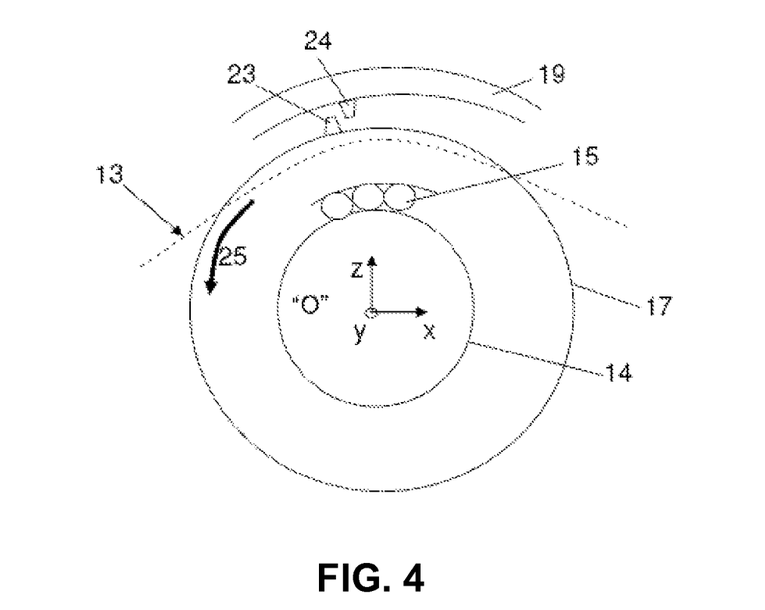

FIG. 4 shows a part of the planetary gear unit 20 as illustrated in FIG. 2, viewed as indicated by arrow A, i.e. from rotor side. The figure shows a planet shaft 14 and a planet gear 17 rotatably mounted on the planet shaft 14 by means of planet bearing 15. The dashed line schematically illustrates the bogie plate 13. The planet shaft 14 is located in a bore (not shown in FIG. 4, see further) in the bogie plate 13. The planet gear 17 is mounted such that its teeth 23 mesh with teeth 24 of the ring gear 19.

As known by a person skilled in the art, during operation of the planetary gear unit 20 there is a so-called bogie plate action. This means that during operation, the bogie plate 13 adjusts around the z-as (as indicated by the coordinate system illustrated in FIG. 4) and around the x-as with a pole at point "O". This point "O" is defined as pressure point. During operation, the bore in the bogie plate 13 will be deformed and because of this deformation the planet shaft 13 will be pressed against that side of the bore, inducing a high pressure. Under low load conditions, bearing pretension can cause the planet shaft 14 to rotate in a same direction as the planet gears 17, i.e. in an anti-clockwise direction as indicated by arrow 25.

Figure 5:
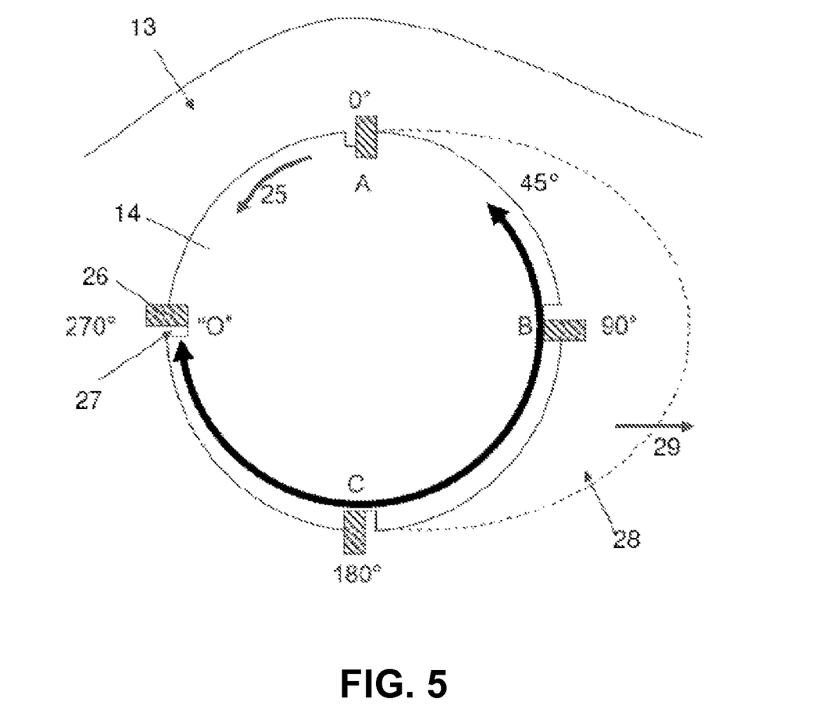

Determining a location for providing the key according to embodiments of the invention will be explained by indicating four possible locations, indicated as A, B, C and "O" in FIG. 5. When providing a key 26 in a keyway 27 located at this four locations, during operation and because of the rotation in anti-clockwise direction (indicated by arrow 25) of the planet shaft 14 under low load conditions, the keys 26 will be pressed against a side of the keyways 27 as indicated in FIG. 5, thereby blocking the rotation of the planet shaft 14. As already described above, during operation of the planetary gear unit 20 the bores 28 in the bogie plate 13 will be deformed in a direction indicated by arrow 29 (deformation of the bores 28 is indicated by the dashed line in FIG. 5). At locations "O", C and B, this deformation will have no or substantially no influence on the key 26. At location A however, because of the deformation of the bore 28, the key 26 will be pressed even harder against the side of the keyway 27, thereby inducing a high stress.

A combination of the above described aspects teaches that location A is not very suitable for providing the key 26, because of the high stresses introduced during operation of the planetary gear unit 20.

Figure 6:
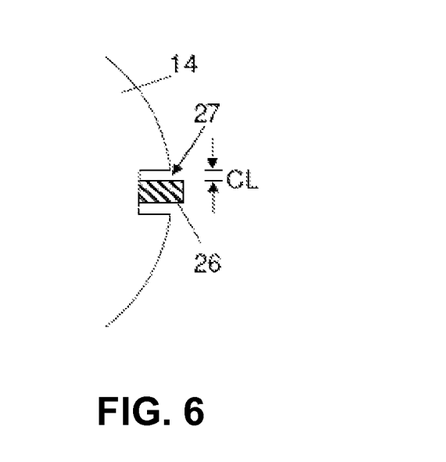

It has furthermore to be kept in mind when determining the location of the key 26 at the planet shaft 14 that, under normal working conditions, elastic deformation of the bogie plate 13 causes the key 26 and keyway 27 to be displaced in the bogie plate 13 such that there is substantially no contact between the key 26 and the keyway 27 in the planet shaft 14. With normal working conditions is meant conditions whereby the planet shaft 14 is prevented from rotating relatively to the bogie plate 13 through the working of friction between the planet shaft 14 and a side of the bore 28 in the bogie plate 13. In that case, a clearance CL may be formed between the key 26 and the keyway 27 such that it is as if the key 26 should not be there (see FIG. 6).

Locations B, C and "O" will, as said above, not experience any substantial influence of deformation of the bore 28. Therefore, these location and the locations in between may be a good location for providing the key 26 and keyway 27. Furthermore, between location A and B there are also locations, more particularly locations between location B and somewhere halfway locations A and B where the key 26 will also not experience any significant influence of deformation of the bore 28. Further upwards towards location A, i.e. from halfway between locations A and B away from location B, the influence of the deformation of the bore 28 on the key 26 will increase because of increasing stresses.

Carefully performing an exercise by keeping in mind each and every criteria described above, revealed that an optimum location for providing the key 26 and keyway 27 at the planet shaft 14 is a location between 45° and 270° (see bolt arrow in FIG. 5) in a clockwise direction around the circumference of the planet shaft 14 as seen from the rotor side onwards, with 0° being defined as a point at the planet shaft circumference corresponding with the largest distance from the centre BC of the bogie plate 13 seen from the rotor side onwards.

It has to be understood that, according to embodiments of the invention, any location in between 45° and 270° can be a 'good' location for providing the key 26 and keyway 27, depending on the predetermined requirements and depending on the design and shape of the bogie plate 13, or more in general on the design and shape of the backplate 13.

However, according to embodiments of the invention and/or for particular applications and/or for particular requirements, stricter criteria may be necessary. For example, although at location "O" the key 26 will experience no or substantially no influence of the deformation of the bore 28, it may, for some applications, be less suitable for locating the key 26 because at that that location the planet shaft 14 is pressed against the side of the bore 28, thereby forming a pressure zone, as described earlier in this description. Therefore, according to those embodiments of the invention, the key 26 and keyway 27 may be provided at locations between 45° and 225°. According to still further embodiments, the key 26 and keyway 27 may be provided at locations between 90° and 270° or between 90° and 225°. According to still further embodiments of the invention, the key 26 and keyway 27 may, for example, be provided at a location positioned between 90° and 200° or between 90° and 180° or between 100° and 225° or between 100° and 200° or between 100° and 180°.

The key 26 that may be used with the present invention may be any key having any suitable shape as known by a person skilled in the art, such as for example but not limited to, a rectangular or circular key. Furthermore, providing a keyway 27 in the planet shaft 14 may be performed according to any known technique and may done in any way as known by a person skilled in the art.

Moreover, and as already described above, the invention is not limited to a planetary gear unit 20 comprising a planet carrier 11 having a bogie plate 13. The principle of the present invention may be applied to any existing planet carrier having any kind of backplate.

In a second aspect, the present invention provides a gearbox comprising a planetary gear unit 20 according to embodiments of the invention as described above. The planetary gear unit 20 comprises a planet carrier 11 comprising a backplate 13 and is provided with planet shafts 14 distributed uniformly around the planet carrier's axis and extending through bores 28 in the backplate 13, each planet shaft 14 thereby rotatably supporting a pair of planet gears 17, 18 by means of planet bearings 15, 16, the planet gears 17, 18 being mounted between a ring gear 19 and a sun gear 21 for mutual interaction. The planetary gear unit 20 furthermore comprises a key 26 provided in a keyway 27 in the planet shaft 14 and extending to the backplate 13 for preventing the at least one planet shaft 14 from rotating around its own axis. According to embodiments of the present invention, the key 26 and keyway 27 are provided in the at least one planet shaft 14 at a location positioned between 45° and 270° in a clockwise direction around the circumference of the planet shaft 14 as seen from the rotor side onwards, with 0° being defined as a point at the planet shaft circumference corresponding with the largest distance from the centre BC of the bogie plate 13 seen from the rotor side onwards.

According to embodiments of the invention, a key 26 and keyway 27 may be provided in all planet shafts 14 of the planetary gear unit 20.

The location of the key 26 and keyway 27 may be such that, under conditions whereby the planet shaft 14 is prevented from rotating relatively to the backplate 13 through the working of friction, elastic deformation of the backplate 13 causes the key 26 and keyway 27 to be displaced in the backplate 13 such that there is substantially no contact between the key 26 and the keyway 27 in the planet shaft 14. Depending on the design or shape of the backplate 13, it was found that such locations are between 45° and 270° in a clockwise direction around the circumference of the planet shaft 14.

With "under conditions whereby the planet shaft 14 is prevented from rotating relatively to the backplate 13 through the working of friction" is meant during normal working conditions under which high loads, more particularly high torque, is introduced in the planetary gear unit 20. Under such normal working conditions of the planetary gear unit 20, i.e. at high torque, the location of the key 26 and keyway 27 should be such that, with respect to the planet shaft 14 and backplate 13, it is as if the key 26 was not there and the planet shaft 14 and the backplate 13 do not "feel" the presence of this key 26. Under such conditions, friction between the planet shaft 14 and a side of the bore 28 in which the planet shaft 14 is located is high enough to prevent the planet shaft 14 from rotating around its own axis. Under low load conditions, however, such friction is not high enough for preventing the planet shaft 14 from rotating around its own axis and in that case the location of the key 26 should be such that it blocks the planet shaft 14.

Moreover, suitable locations for the key 26 and keyway 27 are preferably not locations where the bores 28 in the backplate 13 show high stresses (see further). The existence and location of zones of high stresses may be dependent on the type of planetary gear unit 20 and thus depending on the type of backplate 13 used. However, for each type of backplate 13, a person skilled in the art can easily determine the existence and location of such zones of high stresses of the bores 28 in the backplate 13.

According to particular embodiments of the invention and depending on the design and shape of the backplate 13, the key 26 and keyway 27 may be provided at a location positioned between 90° and 270° or between 90° and 225°. According to further particular embodiments of the invention, the key 26 and keyway 27 may, for example, be provided at a location positioned between 90° and 200° or between 90° and 180° or between 100° and 225° or between 100° and 200° or between 100° and 180°.

A gearbox according to embodiments of the invention may comprise any planetary gear unit 20 as described with respect to the first aspect of the invention.

For example, according to particular embodiments of the invention, the planetary gear unit 20 may comprise a bogie plate 13 as backplate.

In a third aspect, the present invention provides a wind turbine comprising a gearbox according to embodiments of the invention. A wind turbine according to embodiments of the invention may comprise a gearbox comprising any planetary gear unit 20 as described with respect to the first aspect of the invention.

The planetary gear unit 20 comprises a planet carrier 11 comprising a backplate 13 and is provided with planet shafts 14 distributed uniformly around the planet carrier's axis and extending through bores 28 in the backplate 13, each planet shaft 14 thereby rotatably supporting a pair of planet gears 17, 18 by means of planet bearings 15, 16, the planet gears 17, 18 being mounted between a ring gear 19 and a sun gear 21 for mutual interaction. The planetary gear unit 20 furthermore comprises a key 26 provided in a keyway 27 in the planet shaft 14 and extending to the backplate 13 for preventing the at least one planet shaft 14 from rotating around its own axis. According to embodiments of the present invention, the key 26 and keyway 27 are provided in the at least one planet shaft 14 at a location positioned between 45° and 270° in a clockwise direction around the circumference of the planet shaft 14 as seen from the rotor side onwards, with 0° being defined as a point at the planet shaft circumference corresponding with the largest distance from the centre BC of the bogie plate 13 seen from the rotor side onwards.

According to particular embodiments of the invention and depending on the design and shape of the backplate 13, the key 26 and keyway 27 may be provided at a location positioned between 90° and 270° or between 90° and 225°. According to further particular embodiments of the invention, the key 26 and keyway 27 may, for example, be provided at a location positioned between 90° and 200° or between 90° and 180° or between 100° and 225° or between 100° and 200° or between 100° and 180°.

According to particular embodiments of the invention, the planetary gear unit 20 may comprise a bogie plate 13 as backplate.

The invention claimed is:

1. A planetary gear unit (20) comprising:
a planet carrier (11) comprising a backplate (13) and being provided with planet shafts (14) distributed uniformly around the planet carrier's axis and extending through bores (28) in the backplate (13), each planet shaft (14) rotatably supporting a pair of planet gears (17, 18) by means of planet bearings (15, 16), the planet gears (17, 18) being mounted between a ring gear (19) and a sun gear (21) for mutual interaction, and
a key (26) provided in a keyway (27) in the planet shaft (14) and extending to the backplate (13) for preventing the at least one planet shaft (14) from rotating around its own axis,
characterized in that the key (26) and keyway (27) are provided at a location positioned between 45° and 270° in a clockwise direction around the circumference of the planet shaft (14), with 0° being defined as a point at the planet shaft circumference corresponding with the largest distance from the centre (BC) of the back plate (13) seen from a rotor side onwards.

2. A planetary gear unit (20) according to claim 1, wherein the key (26) and keyway (27) are provided at a location positioned between 90° and 270°.

3. A planetary gear unit (20) according to claim 1, wherein the key (26) and keyway (27) are provided at a location positioned between 90° and 225°.

4. A planetary gear unit (20) according to claim 1, wherein the key (26) and keyway (27) are provided at a location positioned between 90° and 200° or between 90° and 180° or between 100° and 225° or between 100° and 200° or between 100° and 180°.

5. A planetary gear unit (20) according to claim 1, wherein the backplate (13) is a bogie plate (13) on which the planet shafts (14) are mounted and which is connected to a remaining part of the planet carrier (11) by means of studs (12), each planet shaft (14) supporting a pair of planet gears (17, 18), the planet gears (17, 18) of each pair being mounted at opposite sites of the bogie plate (13).

6. A planetary gear unit (20) according to claim 1, wherein the key (26) has a rectangular or circular shape.

7. A gearbox comprising a planetary gear unit (20), the planetary gear unit (20) comprising:

a planet carrier (11) comprising a backplate (13) and being provided with planet shafts (14) distributed uniformly around the planet carrier's axis and extending through bores (28) in the backplate (13), each planet shaft (14) rotatably supporting a pair of planet gears (17, 18) by means of planet bearings (15, 16), the planet gears (17, 18) being mounted between a ring gear (19) and a sun gear (21) for mutual interaction, and a key (26) provided in a keyway (27) in the planet shaft (14) and extending to the backplate (13) for preventing the at least one planet shaft (14) from rotating around its own axis, characterized in that the key (26) and keyway (27) are provided at a location positioned between 45° and 270° in a clockwise direction around the circumference of the planet shaft (14), with 0° being defined as a point at the planet shaft circumference corresponding with the largest distance from the centre (BC) of the back plate (13) seen from a rotor side onwards.

8. A gearbox according to claim 7, wherein the key (26) and keyway (27) are provided at a location positioned between 90° and 270°.

9. A gearbox according to claim 7, wherein the key (26) and keyway (27) are provided at a location positioned between 90° and 225°.

10. A wind turbine comprising a gearbox according to claim 7.

* * * * *